Oct. 6, 1942.     H. M. McCOY     2,297,712
INTEGRATED MODEL AIRPLANE
Filed June 11, 1941     3 Sheets-Sheet 1
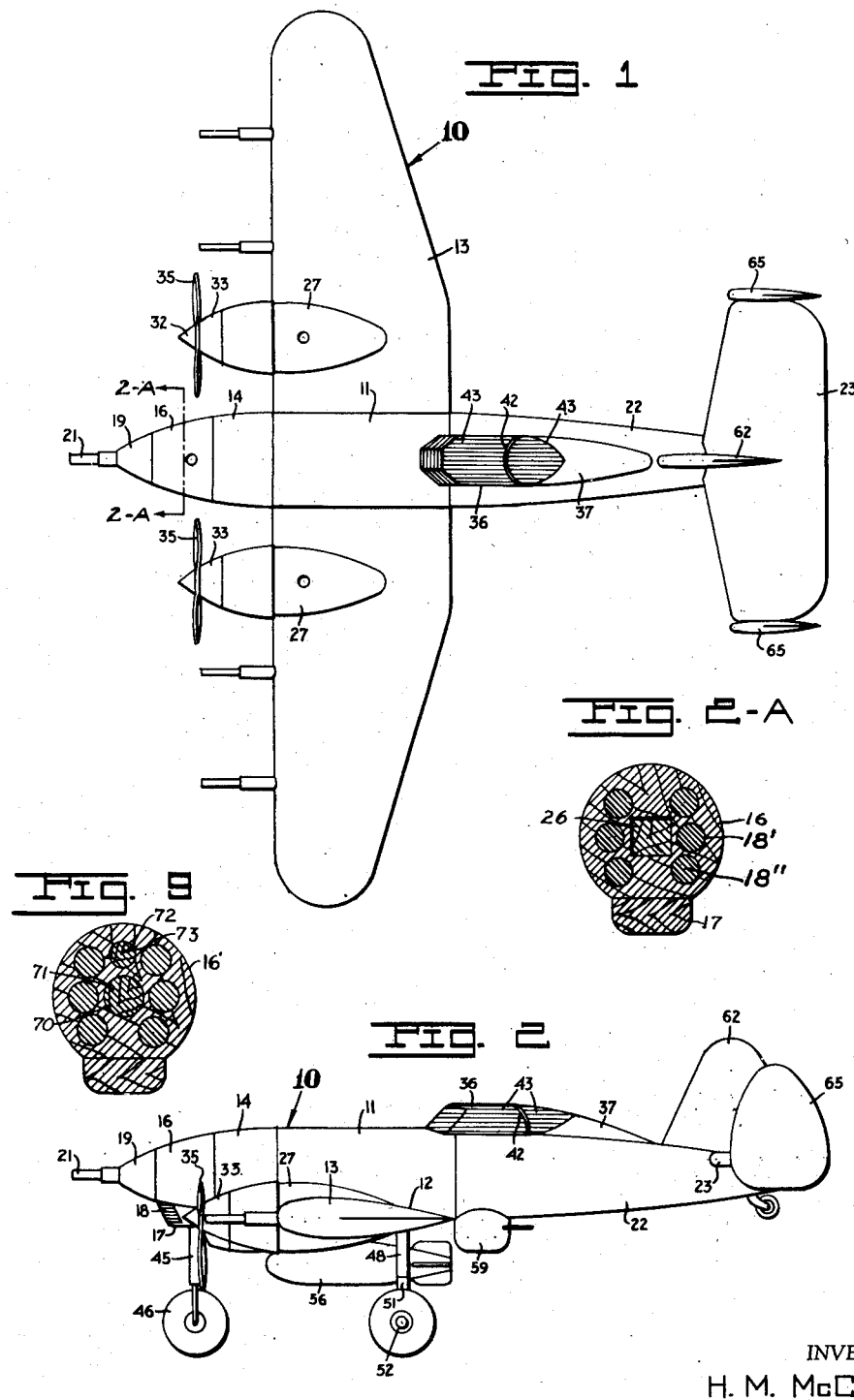
INVENTOR.
H. M. McCoy
BY Oct. 6, 1942.  H. M. McCOY  2,297,712
INTEGRATED MODEL AIRPLANE
Filed June 11, 1941   3 Sheets-Sheet 2
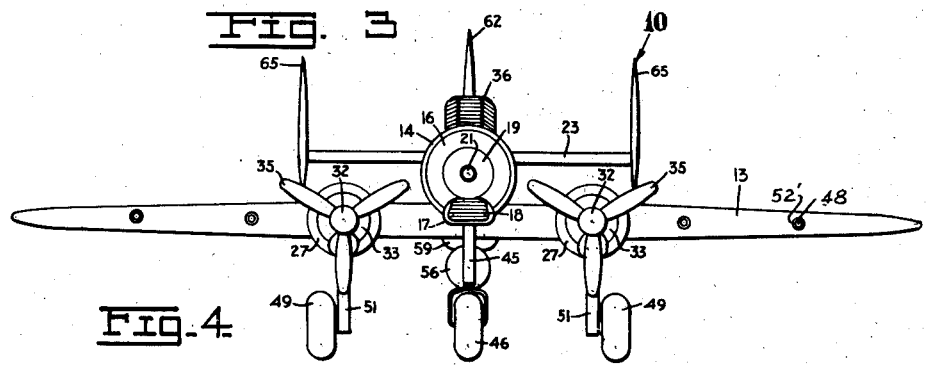
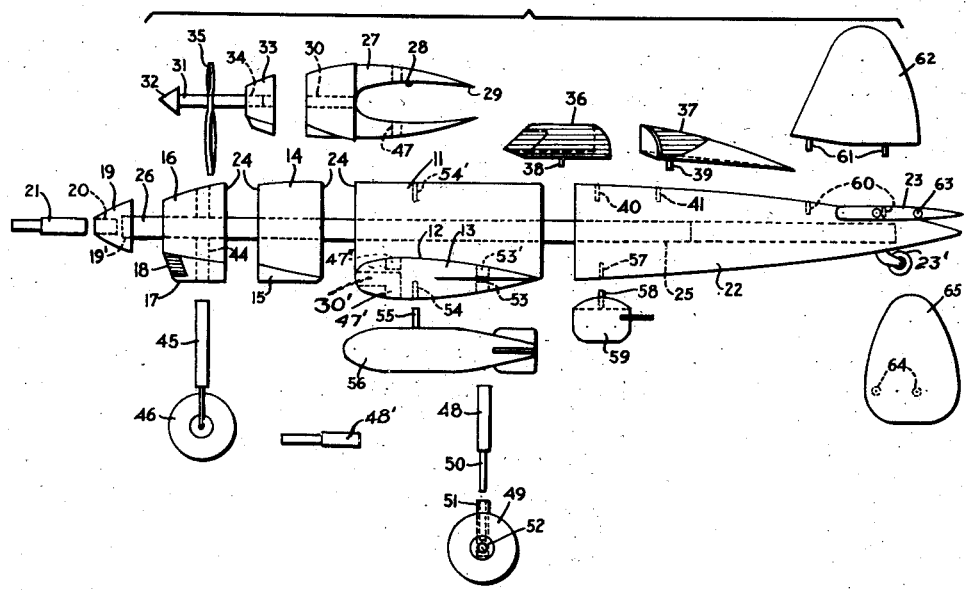
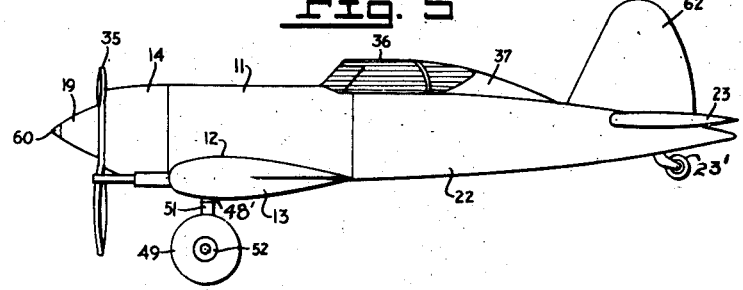
INVENTOR.
H. M. McCoy
BY Oct. 6, 1942.   H. M. McCOY   2,297,712
INTEGRATED MODEL AIRPLANE
Filed June 11, 1941   3 Sheets-Sheet 3
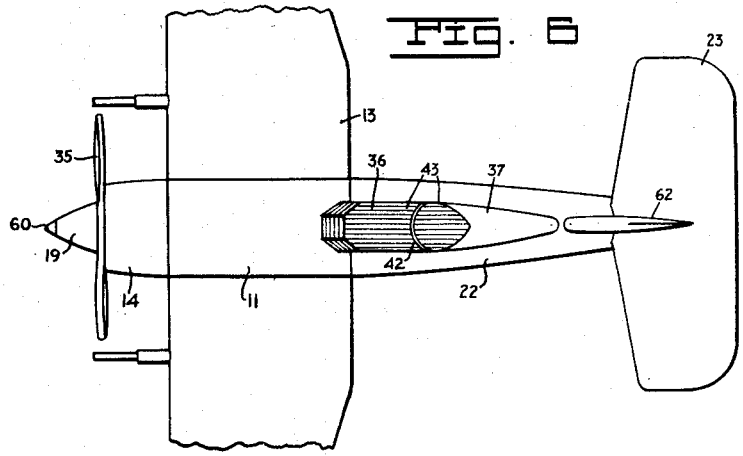
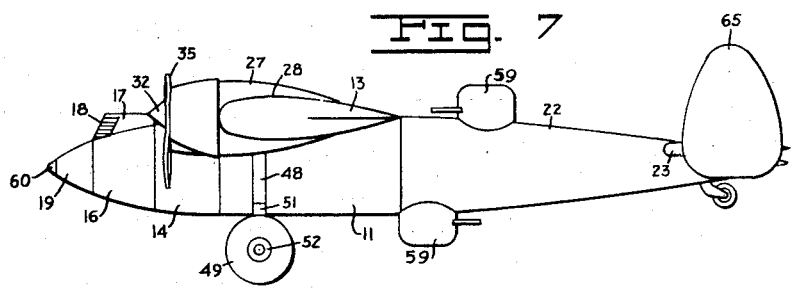
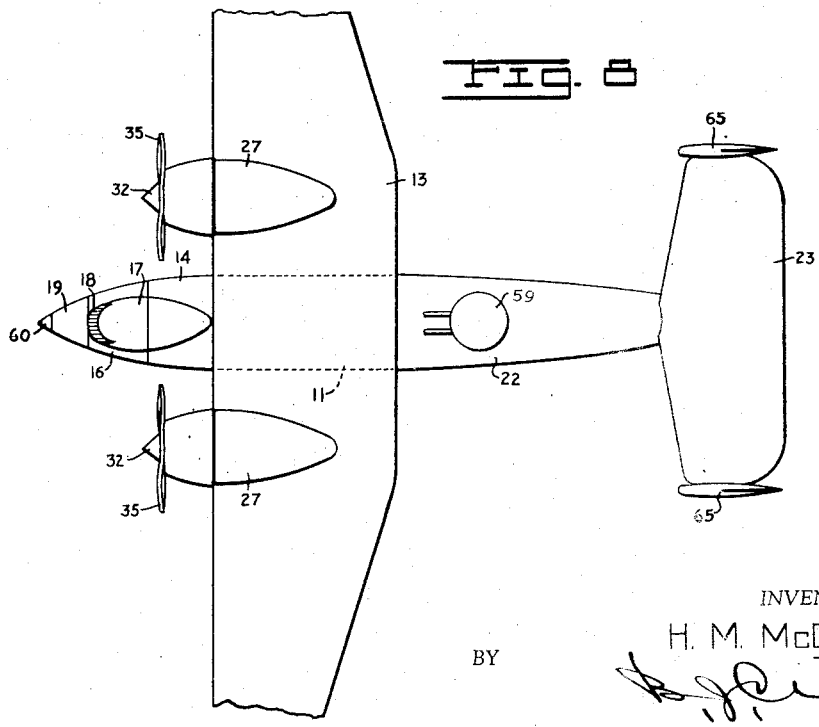
INVENTOR.
H. M. McCoy Patented Oct. 6, 1942

2,297,712

UNITED STATES PATENT OFFICE 2,297,712

INTEGRATED MODEL AIRPLANE

Howard M. McCoy, Pasadena, Calif.

Application June 11, 1941, Serial No. 397,567

6 Claims. (Cl. 46—17)

This invention relates to integrated model airplanes.

The general object of the invention is to provide a model airplane which consists of a plurality of independently made parts secured together in a novel manner.

Another object of the invention is to provide novel means for securing together the parts of an integrated model airplane.

Another object of the invention is to provide a novel reversible combined body and wing member for use in building a model airplane.

Another object of the invention is to provide a novel means for securing a nacelle on a model airplane.

A further object of my invention is to provide a novel weight member for counter-balancing a model airplane.

Other objects and advantages of the invention will be apparent from the following description taken in connection with the accompanying drawings, wherein:

Fig. 1 is a top plan view of an integrated model airplane including the features of my invention;

Fig. 2 is a side elevational view;

Fig. 2—A is a sectional view on an enlarged scale taken on the line 2—A, Fig. 1;

Fig 3 is a front elevational view;

Fig. 4 is a side elevational extended view with the parts disassembled;

Fig. 5 is a side elevational view of a modification of a model airplane made by a different arrangement of parts;

Fig. 6 is a top plan view of the modification;

Fig. 7 is a side elevational view of a further modification achieved by a further different arrangement of parts;

Fig. 8 is a top plan view of the further modification, and

Fig. 9 is a view similar to Fig. 2A showing a modification.

Referring to the drawings by reference characters, I have shown my invention as embodied in an integrated model airplane which is indicated generally at 10. The airplane is made from a plurality of independently made members which are interchangeably connected and the parts are so made that from a given plurality of parts a large assortment representing various types of aircraft can be readily made.

The parts from which the airplane 10 is constructed are shown in separated position in Fig. 4. As shown, the parts include a main body part 11 which is generally cylindrical in form and is provided with a cut away notch 12 in which a wing 13 is mounted. The contour of the notch substantially equals half of the contour of the wing. The wing is symmetrical about a median plane. The wing is held in place on the body part 11 as by glueing. Due to its shape and arrangement on the body part 11 the wing may be assembled to form a low wing monoplane, as shown in Figs. 1 to 6, or to form a high wing monoplane, as shown in Figs. 7 and 8.

In Fig. 4, immediately in advance of the body part 11, I show a body part 14 which has a depending part 15 forming the rear end of an air duct. In advance of the body part 14 I arrange another body part 16 which has a lower part 17 which with the part 15 completes the air duct. A decorated portion 18 may simulate louvres in the air duct. The body part 16 (see Fig. 2-A) has holes 18' therein in which weights such as lead pins 18" are inserted to provide a counterbalance which is useful for balancing the assembled airplane.

By turning the parts 14 and 16 through 180° the parts 15 and 17 which may also constitute a cockpit enclosure cabin may be arranged on the top of the body. In advance of the portion 16 I show a part 19 which is recessed as at 20 to receive a member 21 which simulates a cannon.

In the rear of the part 11 I show a rear part 22. This part 22 is provided with a horizontal stabilizer-elevator 23 which may be held in place as by glueing. A tail wheel 23' is secured to the under surface of the rear part 22.

The parts 11, 14, 16, 19, and 22 are preferably made of wood, plastic material, etc., and their outer surfaces are correctly contoured. The body parts mentioned have planar end faces 24 which abut when the airplane is assembled. The abutting of the parts is particularly desirable as it adds rigidity to the assembled structure.

Each of the parts 11, 14, 16, and 22 is formed with an aperture 25 which is shown as rectangular in cross section. The member 19 which may simulate a propeller spinner when a single engine model is constructed has an aperture 19' in which the forward end of a rectangular dowel 26 is secured as by glueing. The cross section of the dowell 26 corresponds to cross section of the apertures 25 so that the parts 11, 14, 16, and 22 may be slid along the dowel with a rather tight sliding fit thus firmly securing the parts together but permitting their ready removal when desired.

Mounted on the wing along each side of the body I show a nacelle 27 which includes a body with a substantially frustro conical frontal portion with the body having a notch forming a recess 28 in the rear portion. The recess 28 corresponds in shape to that of the wing and may include re-entrant end portions 29. The nacelle is preferably secured in place by sliding it inwardly from the outer end of the wing so that the re-entrant portion 29 grips the wing thus aiding in holding the nacelle in place. The resiliency of the material will serve to hold the nacelle in place although other securing means may be employed if desired. The body of each nacelle includes a hole 30 which aligns with a hole 30' in the wing. A pin 31 enters the holes 30 and 30'. The pin 31 has a conical front portion 32, which simulates a propeller spinner. The pin 31 supports an engine nose extension 33 which has a hole 34 through which the pin extends. A propeller 35 here shown with three blades, is shown as mounted on the pin 31 in advance of the cowling. When the part 33 is used the entire engine nacelle simulates an in-line engine. When part 33 is left off the assembly the remaining nacelle members simulate a radial engine. The front planar face of part 30 may be decorated so as to simulate a radial engine.

The construction shown in Figs. 1 to 4 further includes a cabin cockpit enclosure including a forward portion 36 and a rear portion 37 which have pins 38 and 39 respectively which fit in apertures 40 and 41 respectively in the rear body part 22. The cabin members 36 and 37 are joined along a curved line 42 as shown in Fig. 1. The cabin may be suitably decorated as at 43 to simulate transparent material. The cabin enclosure member 37 may be replaced with a rotary gun housing 59, whose radius and pin position is substantially equal to the radius of curved line 42 and pin 39.

The body part 16 as shown is provided with a recess 44 in which a rod 45 on a landing wheel 46 is inserted. The wing is provided with holes 53 and 53' in which rods 48 on the rear landing wheels 49 may be inserted when tricycle landing gear arrangements are made. The rods 48 each include a reduced lower portion 50 which is removably inserted in a tube 51 which is secured to the axle 52 of the landing wheel 49. Also the nacelles are provided with holes 47 which align with holes 47' and 47'' in the wing. When conventional three point landing gear arrangements are made rods 48' shorter than the rods 48 may be inserted in the holes 47, 47', and 47'' when the landing wheels are to be mounted on the wing. The rods 48' like the rods 48 are inserted in the tubes 51. In Fig. 2 the rod 48 is inserted in the hole 53 while in Fig. 5, to be later described, the rod 48' is inserted in the hole 47' and in Fig. 7, also to be later described, the rod 48 is inserted in the holes 47 and 47'.

The leading edge of the wing has spaced holes 52' to receive the rods 48 or 48' which simulate machine guns or cannon. Arranged in the wing and immediately below the body part 11 I show a hole 54 which receives a pin 55 on a torpedo or bomb 56. When the pin 55 is inserted in the hole 54 the torpedo is held in service position. A hole 54' accommodates pin 55 when the high wing position is used.

Rods, such as the rods 48 inserted in the apertures 47, 47' and 47'', serve to hold the nacelles in place so that dependence on the re-entrant portions 29 may not be necessary.

The rear part 22 is provided with a hole 57 in which a pin 58 on a rotary gun housing 59 is inserted to hold the housing in place. This part 59 fits interchangeably with the cabin enclosure part 37, as described above. The rotary gun housing 59 may be decorated to simulate transparent material.

The body rear part 22 and the stabilizer-elevator 23 are provided with apertures 60 which receive pins 61 on a rudder 62. Each end of the elevator 23 is provided with a pair of holes 63 in which pins 64 on a rudder 65 are inserted to hold the end rudders in place.

In Figs. 5 and 6 I show the parts constituting my invention assembled to form a low wing monoplane of the type somewhat different from that shown in Figs. 1 to 4 inclusive. In these figures the airplane includes the body parts 11, 14, and 22 with the rudder 62 in place. The cabin portions 36 and 37 are also employed. The front planar face of the member 14 is engaged by the propeller 35. The nacelles 27 are omitted in this construction. The part 19 serves to hold the propeller in place and simulates a propeller spinner. The hole 20 in the member 19 is closed by a tip 60. The part 37 may be replaced with a rotary gun housing 59 and rudder 62 by twin rudders 65.

When the part 16 and the propeller 35 are used the forward body assembly simulates an in-line engine. When the propeller 35 is used but the part 16 omitted, the assembly simulates a radial engine. The front planar face of the part 14 may be suitably decorated so as to simulate a radial engine.

In Figs. 7 and 8 the invention is arranged to form a high wing monoplane wherein the body parts 11, 14, 16, 19, and 60 are employed. The parts 14 and 16 are turned through 180° from the position shown in Figs. 1 to 4 so that the portions 15 and 18 are above the body and simulate a cabin with the decorated part 18 simulating a window.

In Figs. 7 and 8 engine nacelles 27 are employed but the forward portion 33 of these nacelles are omitted so that a radial type engine is simulated. The propeller 35 and the tip 32 which simulates a propeller spinner are the same as those previously described. The rear part 22 is provided with rudders 65 at the end thereof. When desired the cabin members 36 and 37 may be removed and gun housing 59 may be mounted as shown in the drawings.

In Fig. 9 I show a modification of the means for securing the parts together. As shown the body 16' is provided with a cylindrical hole 70 in which a cylindrical dowel pin 71 is inserted. To prevent rotation an auxiliary dowel pin 72 is inserted in aligned apertures 73 so that rotation of the body parts about the dowel 71 is prevented.

In the accompanying drawings I have shown my invention as applied to a land plane. The inventive features could however be embodied with equal facility in making integrated model planes having suitable pontoons on the body and/or on the wings or the device could be made as an amphibian airplane or seaplane by substituting or adding pertinent body parts.

From the foregoing description it will be apparent that I have invented a novel integrated model airplane which can be economically manufactured, readily assembled, and which is highly efficient for its intended purpose.

Having thus described my invention, I claim:

1. A combination set of integrated model airplane parts comprising a plurality of contoured, elongated, body parts having planar abutting ends representing the fuselages of different types of airplanes, an elongated rearwardly tapered part representing the rear part of a fuselage and having a planar face abutting a planar face on the rear of the adjacent body part, means to hold said parts in axial alignment and to prevent relative rotation between the parts, a rudder and an elevator mounted on said rear part, one of said body parts having a wing receiving recess, a wing engaging in said recess, said wing being symmetrical and the body part being rotatable through 180° so that the wing may be arranged to simulate either a high wing monoplane or a low wing monoplane, and wheel assemblies mountable on either side of said wing.

2. A combination set of integrated model airplane parts comprising, a plurality of contoured, elongated, body parts having planar abutting ends representing the fuselages of different types of airplanes, an elongated rearwardly tapered part representing the rear part of a fuselage and having a planar face abutting a planar face on the rear of the adjacent body part, means to hold said parts in axial alignment and to prevent their relative rotation, a rudder and an elevator mounted on said rear part, one of said body parts having a wing receiving recess, a wing engaging in said recess, said wing being symmetrical and the body part being rotatable through 180° so that the wing may be arranged to simulate either a high wing monoplane or a low wing monoplane, a pair of engine nacelles on the wing, each of said nacelles having a slot therein corresponding to the cross section of the wing, removable engine nose extension simulating members on each nacelle, said extension members, said nacelles and said wing having aligned holes, pins in said holes to hold said members in place, said pins having heads thereon, and a propeller on each pin and between the head and the adjacent part of the nacelle.

3. A combination set of integrated model airplane parts comprising a plurality of contoured, elongated, body parts having planar abutting ends representing the fuselages of different types of airplanes, an elongated rearwardly tapered part representing the rear part of a fuselage and having a planar face abutting the planar face on the rear of the adjacent body part, means to hold said parts in axial alignment and to prevent relative rotation thereof, a rudder and an elevator mounted on said rear part, said rudder and elevator having a pin and hole connection, one of said body parts having a wing receiving recess, a wing engaging in said recess, said wing being symmetrical and the body part being rotatable through 180° so that the wing may be arranged to simulate either a high wing monoplane or a low wing monoplane, a pair of engine nacelles on the wing, each of said nacelles having a slot therein corresponding to the cross section of the wing, said nacelles having reentrant rear portions partially closing the slot whereby the nacelle is held in place, removable engine nose extension simulating members on each nacelle, said extension members, said nacelles and said wing having aligned holes, pins in said holes to hold said members in place, said pins having heads thereon, a propeller on each pin and between the head and the adjacent part of the nacelle, said wing having holes therein and wheel assemblies including pins fitting in last mentioned holes.

4. A combination set of integrated model airplane parts comprising a plurality of contoured, elongated, body parts having planar abutting ends representing the fuselages of different types of airplanes, an elongated rearwardly tapered part representing the rear part of a fuselage and having a planar face abutting a planar face on the rear of the adjacent body part, means to hold said parts in axial alignment and to prevent relative rotation between the parts, a rudder and an elevator mounted on said rear part, and a wing mounted on one of said body parts, said wing being symmetrical and the body part being rotatable through 180° so that the wing may be arranged to simulate either a high wing monoplane or a low wing monoplane.

5. A combination set of integrated model airplane part comprising a plurality of contoured, elongated, body parts representing the fuselages of different types of airplanes, an elongated rearwardly tapered part representing the rear part of a fuselage, means to hold said parts in axial alignment and to prevent relative rotation between the parts, a rudder and an elevator mounted on said rear part, one of said body parts having a wing receiving recess, a wing engaging in said recess, said wing being symmetrical and the one body part being rotatable through 180° so that the wing may be arranged to simulate either a high wing monoplane or a low wing monoplane, and wheel assemblies mountable on either side of said wing.

6. A combination set of integrated model airplane parts comprising a plurality of contoured, elongated, body parts having matching ends adapted to be assembled in abutting relation representing the fuselages of different types of airplanes, an elongated rearwardly tapered part representing the rear part of a fuselage and having an end portion which matches the adjacent body part in each of two relative positions rotated 180° with respect to each other, means to hold said parts in axial alignment and to prevent relative rotation between the parts when assembled in either of said relations, a rudder and an elevator adapted to be mounted on the rear part, and a wing mounted on the body part adjacent said rear part, the combined wing and body being rotatable about a longitudinal axis through 180° so that the wing may be arranged to simulate either a high wing monoplane or a low wing monoplane.

HOWARD M. McCOY.